(12) United States Patent
Yu et al.

(10) Patent No.: US 12,704,724 B2
(45) Date of Patent: Aug. 11, 2026

(54) DIFFRACTIVE OPTICAL ASSEMBLY AND HEAD-MOUNTED DISPLAY HAVING THE SAME

(71) Applicant: National Central University, Taoyuan City (TW)

(72) Inventors: Yeh-Wei Yu, Taoyuan City (TW); Ching-Cherng Sun, Taoyuan City (TW); Wei-Chia Su, Changhua County (TW)

(73) Assignee: National Central University, Taoyuan City (TW)

( * ) Notice: Subject to any disclaimer, the term of this patent is extended or adjusted under 35 U.S.C. 154(b) by 580 days.

(21) Appl. No.: 18/321,792

(22) Filed: May 23, 2023

(65) Prior Publication Data

US 2024/0393590 A1 Nov. 28, 2024

(51) Int. Cl.
*G02B 27/01* (2006.01)
*G02B 27/42* (2006.01)

(52) U.S. Cl.
CPC ..... *G02B 27/0172* (2013.01); *G02B 27/4205* (2013.01); *G02B 2027/0174* (2013.01)

(58) Field of Classification Search
CPC ............ G02B 27/0172; G02B 27/4205; G02B 2027/0174; G02B 27/0081; G02B 2027/0178
See application file for complete search history.

(56) References Cited

U.S. PATENT DOCUMENTS

2008/0239428 A1* 10/2008 Bell ........................ G11B 7/135 359/30
2010/0302185 A1 12/2010 Han et al.
2017/0131551 A1* 5/2017 Robbins .............. G02F 1/13439
(Continued)

FOREIGN PATENT DOCUMENTS

JP H10-513575 A 12/1998
JP 2007-128654 A 5/2007
(Continued)

OTHER PUBLICATIONS

Solomashenko et al. "Image Quality for Near-eye display based on holographic waveguides" (Year: 2022).*
(Continued)

*Primary Examiner* — Bumsuk Won
*Assistant Examiner* — John C Sipes
(74) *Attorney, Agent, or Firm* — CKC & Partners Co., LLC

(57) ABSTRACT

A diffractive optical assembly includes an input coupler, an output coupler, and an image source. The output coupler is next to the input coupler. One of the input coupler and the output coupler has a most critical holographic optical element (HOE), and another one has a diffractive optical element (DOE). Bragg condition of the most critical HOE is more sensitive than Bragg condition of the DOE. The image source is configured to generate image light that is incident to the input coupler then propagates to the output coupler. The image light has incident angles to the input coupler and
(Continued)

wavelengths corresponding to the incident angles. The wavelengths of the image light on the image source have a two-dimensional spatial distribution, such that relationships between the incident angles and the wavelengths of the image light comply with Bragg selectivity of the most critical HOE.

23 Claims, 18 Drawing Sheets

(56) References Cited

U.S. PATENT DOCUMENTS

| | | | | |
|---|---|---|---|---|
| 2018/0364482 | A1 | 12/2018 | Georgiou et al. | |
| 2019/0086598 | A1* | 3/2019 | Futterer | G02B 27/48 |
| 2020/0117006 | A1* | 4/2020 | Kollin | G02B 27/0179 |
| 2020/0341280 | A1* | 10/2020 | Bablumyan | G02B 5/32 |
| 2021/0294021 | A1* | 9/2021 | Romero | G02F 1/1335 |
| 2023/0004121 | A1* | 1/2023 | Hong | G03H 1/2294 |
| 2024/0099044 | A1* | 3/2024 | Yoo | C09K 11/70 |
| 2024/0134190 | A1* | 4/2024 | Ogata | G02B 27/0101 |
| 2024/0329416 | A1* | 10/2024 | Iazikov | G02B 27/142 |
| 2024/0345388 | A1* | 10/2024 | Yang | G02B 27/0172 |

FOREIGN PATENT DOCUMENTS

| | | | |
|---|---|---|---|
| JP | 2016-143438 | A | 8/2016 |
| JP | 2021-119378 | A | 8/2021 |
| JP | 2022-544733 | A | 10/2022 |
| JP | 2023-503548 | A | 1/2023 |
| WO | 2005-117001 | A1 | 12/2005 |

OTHER PUBLICATIONS

Zhang et al. “Improved Holographic Waveguide display systems” (Year: 2014).*

* cited by examiner

DIFFRACTIVE OPTICAL ASSEMBLY AND HEAD-MOUNTED DISPLAY HAVING THE SAME

BACKGROUND

Field of Invention

The present disclosure relates to a diffractive optical assembly and a head-mounted display having the diffractive optical assembly.

Description of Related Art

Nowadays, an exit-pupil expansion (EPE) is achieved in head-mounted displays by utilizing diffractive optical elements (DOEs) as couplers for planar waveguides, in which the DOEs include surface relief gratings (SRGs), meta surface, and thin and volume holographic optical elements (HOEs). When the volume HOE acts as the coupler of the head-mounted display to diffract planar waves from an image source, the diffractive efficiency of the volume HOE depends on the wavelength and the angle of incidence of the planar wave, which is called Bragg selectivity.

Therefore, for the planar wave with a specific wavelength, the angle of incidence has a tolerance lower than 10 degrees, which limits the field of view (FOV) of the head-mounted display. On the contrary, for the planar wave of a broadband light source, only a portion of the planar wave can be diffracted at each angle of incidence and the energy loss of the planar waves exceeds 90 percent, resulting in poor optical efficiency.

SUMMARY

One aspect of the present disclosure provides a diffractive optical assembly.

According to some embodiments of the present disclosure, a diffractive optical assembly includes an input coupler, an output coupler, and an image source. In the light path, the output coupler is behind the input coupler. One of the input coupler and the output coupler has a most critical holographic optical element (HOE), another one of the input coupler and the output coupler has a diffraction optical element (DOE). Bragg condition of the most critical HOE is more sensitive than Bragg condition of the DOE. The image source is configured to generate image light incident to the input coupler then propagates to the output coupler. The image light has a plurality of incident angles to the input coupler and a plurality of wavelengths corresponding to the incident angles. The wavelengths of the image light on the image source have a two-dimensional spatial distribution, such that relationships between the incident angles and the wavelengths of the image light comply with Bragg selectivity of the most critical HOE of the input coupler or the output coupler.

In some embodiments, the image source includes a plurality of regions. The regions generate the image light having the incident angles in a plurality of ranges not overlapping with each other. A portion of the two-dimensional spatial distribution of the wavelengths of the image light in each of the regions of the image source is continuous.

In some embodiments, the most critical HOE of the input coupler or the output coupler includes a plurality of first holographic gratings. The first holographic gratings are configured to diffract the image light having the incident angles in the ranges, respectively.

In some embodiments, the most critical HOE of the input coupler or the output coupler includes a plurality of first sub HOEs. The first sub HOEs are configured to diffract the image light having the incident angles in the ranges, respectively.

In some embodiments, the image source includes a light source and a plurality of quantum dots located on the light source. Sizes of the quantum dots vary on the plane of the image source, such that the wavelengths of the image light on the image source has the two-dimensional spatial distribution.

In some embodiments, the image source includes a spatial light modulator (SLM), a light source generating source light, and a plurality of quantum dots located on the light source. The sizes of the quantum dots are different, such that wavelengths of the source light irradiating the SLM through the quantum dots has a two-dimensional spatial distribution on the plane of the SLM.

In some embodiments, the image source includes a spatial light modulator (SLM), a light source generating source light, and a dispersive element.

In some embodiments, the light source is disposed at a side of the dispersive element with transmission grating. The dispersive element is configured to disperse the source light passing through the dispersive element to irradiate the SLM, and wavelengths of the source light on the SLM have a two-dimensional spatial distribution.

In some embodiments, the light source is disposed at a side of the dispersive element facing the SLM. The dispersive element is configured to disperse the source light to irradiate the SLM, and wavelengths of the source light on the SLM have a two-dimensional spatial distribution.

In some embodiments, the image source further includes a bandpass filter disposed between the SLM and the dispersive element.

In some embodiments, the dispersive element of the image source includes a surface relief grating, a metasurface, a metalens, a holographic grating, or a volume holographic optical element.

In some embodiments, the image source further includes a spatial light modulator (SLM), a light source generating source light, a dispersive element, a light guide and a regular HOE. The dispersive element is disposed on the light guide. The light source is disposed on a side of the dispersive element facing away the light guide. The SLM and the regular HOE are respectively disposed on two opposite sides of the light guide. The regular HOE is in contact with the light guide. The dispersive element is configured to disperse the source light. The light guide is configured to propagate the source light from the dispersive element to the regular HOE. The regular HOE is configured to reflect some wavelength of the source light to irradiate the SLM, and wavelengths of the source light on the SLM have a two-dimensional spatial distribution.

In some embodiments, the regular HOE of the image source is disposed on one of the two opposite sides of the light guide facing the dispersive element.

In some embodiments, the regular HOE of the image source is disposed on one of the two opposite sides of the light guide facing away from the dispersive element.

In some embodiments, the regular HOE of the image source includes a plurality of second sub HOEs disposed side by side.

In some embodiments, the regular HOE of the image source includes a volume holographic optical element. The dispersive element of the image source includes a holographic grating or a prism.

In some embodiments, the image source includes a plurality of color channels. Each of the color channels is configured to generate a portion of the image light.

In some embodiments, the most critical HOE of the input coupler or the output coupler includes a plurality of first holographic gratings. The first holographic gratings are configured to diffract the image light generated by the color channels, respectively.

In some embodiments, the most critical HOE of the input coupler or the output coupler includes a plurality of first sub HOEs. The first sub HOEs are configured to diffract a portion of the image light generated by the color channels, respectively.

In some embodiments, the diffractive optical assembly further includes a lens disposed between the input coupler and the image source. The image source is located on a focal plane of the lens.

Another aspect of the present disclosure provides a head-mounted display.

According to some embodiments of the present disclosure, a head-mounted display includes a diffractive optical assembly and a light guide. The diffractive optical assembly includes an input coupler, an output coupler, and an image source. In the light path, the output coupler is behind the input coupler. One of the input coupler and the output coupler has a most critical holographic optical element (HOE), another one of the input coupler and the output coupler has a diffraction optical element (DOE). Bragg condition of the most critical HOE is more sensitive than Bragg condition of the DOE. The image source is configured to generate image light that is incident to the input coupler then propagates to the output coupler. The image light has a plurality of incident angles to the input coupler and a plurality of wavelengths corresponding to the incident angles. The wavelengths of the image light on the image source have a two-dimensional spatial distribution, such that relationships between the incident angles and the wavelengths of the image light comply with Bragg selectivity of the most critical HOE of the input coupler or the output coupler. The light guide is connected to the input coupler and the output coupler of the diffractive optical assembly, and disposed between the input coupler and the image source of the diffractive optical assembly.

In some embodiments, the head-mounted display further includes a two-dimensional grating. The two-dimensional grating is disposed on the light guide and between the input coupler and the output coupler. A length and a width of the input coupler are respectively less than a length and a width of the output coupler.

In some embodiments, the head-mounted display further includes a surface relief grating. The surface relief grating is disposed on the light guide. The surface relief grating is aligned with the input coupler along a lengthwise direction of the light guide, and is aligned with the output coupler along a widthwise direction of the light guide.

In the aforementioned embodiments of the present disclosure, since the wavelengths of the image light on the image source have the two-dimensional spatial distribution and the relationships between the incident angles and the wavelengths of the image light comply with Bragg selectivity of the most critical HOE, the energy of the image light may be preserved after the image light is diffracted by the most critical HOE, and the diffractive optical assembly may have higher diffractive efficiency compared with traditional diffractive optical elements. In addition, the head-mounted display having the diffractive optical assembly may enhance the field of view (FOV) while maintaining the optical efficiency and therefore improve the rate of energy utilization of the head-mounted display.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
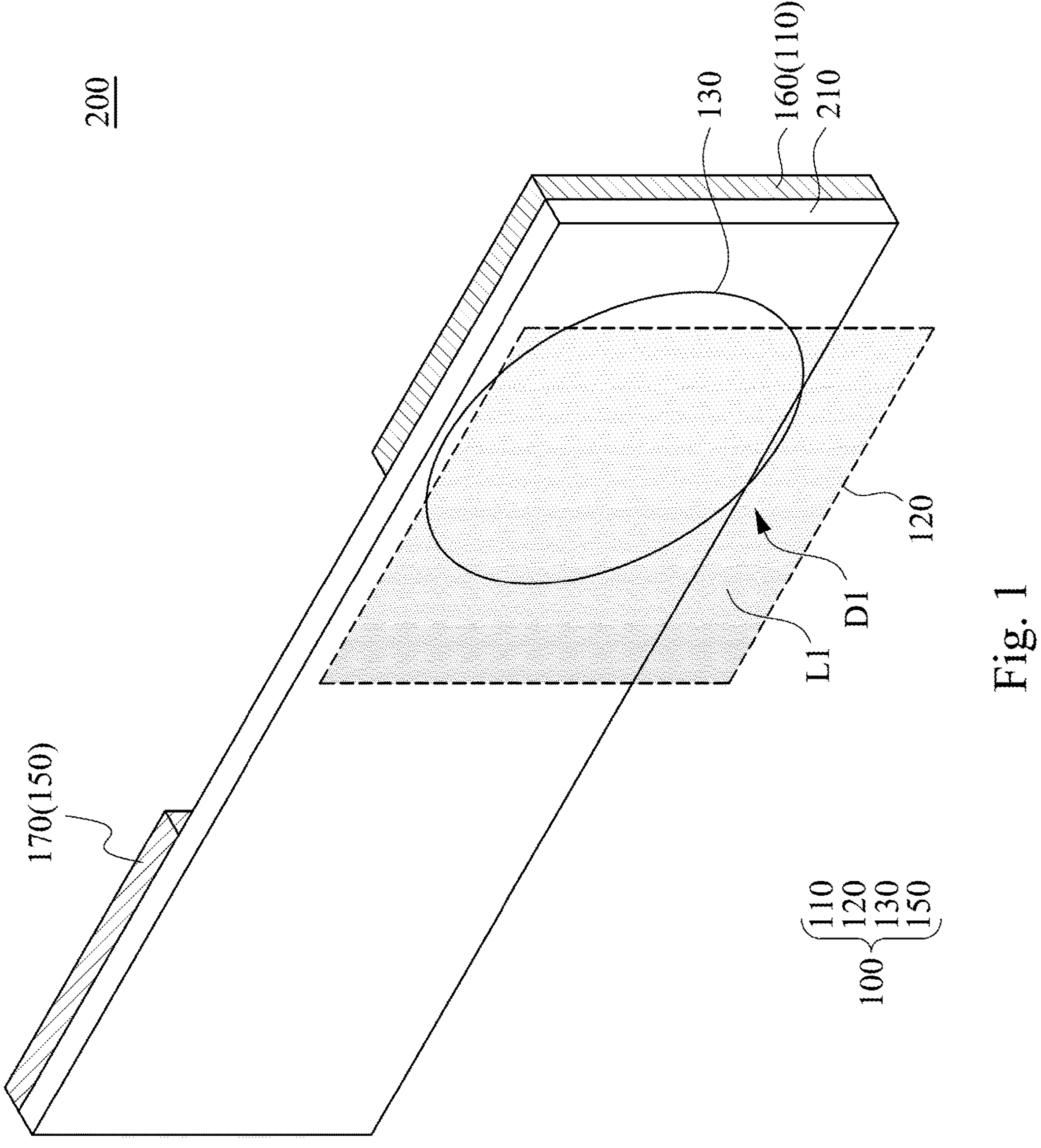
FIG. 1 is a 3D perspective view of a head-mounted display having a diffractive optical assembly according to one embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 2:
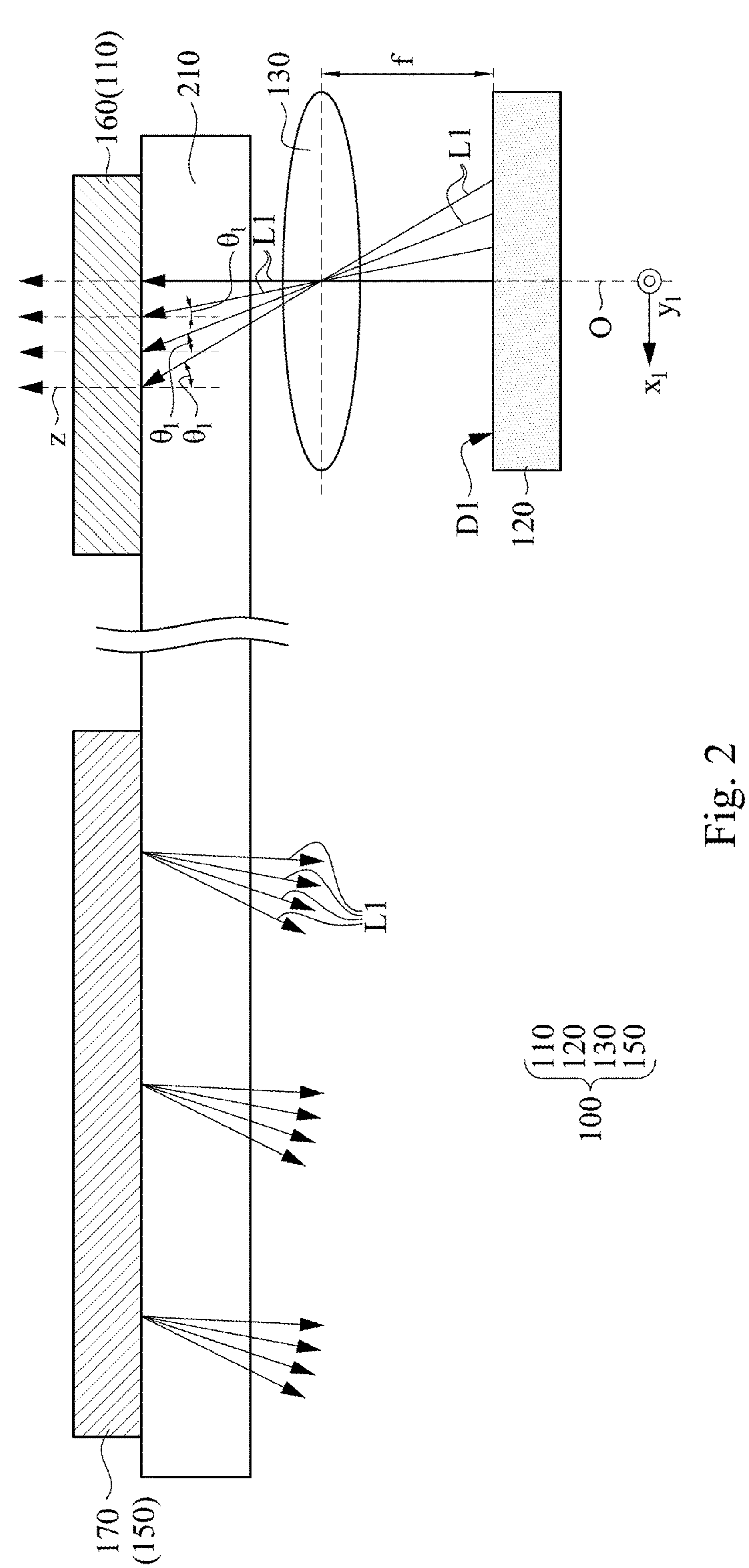
FIG. 2 is a schematic side view of the head-mounted display of FIG. 1 when being in operation.

FIG. 1 is a 3D perspective view of a head-mounted display 200 having a diffractive optical assembly 100 according to one embodiment of the present disclosure. FIG. 2 is a schematic side view of the head-mounted display 200 of FIG. 1 when being in operation. As shown in FIG. 1 and FIG. 2, the head-mounted display 200 includes the diffractive optical assembly 100 and a light guide 210. The diffractive optical assembly 100 includes an input coupler 110, an output coupler 150, and an image source 120. In the light path, the output coupler 150 is behind the input coupler 110. In this embodiment, the output coupler 150 is next to the input coupler 110. One of the input coupler 110 and the output coupler 150 has a most critical holographic optical element (HOE) 160, another one of the input coupler 110 and the output coupler 150 has a diffractive optical element (DOE) 170, and Bragg condition of the most critical HOE 160 is more sensitive than Bragg condition of the DOE 170. The image source 120 is configured to generate image light L1 that is incident to the input coupler 110 then propagates to the output coupler 150. The image light L1 has a plurality of incident angles $\theta_1$ to the input coupler 110 and a plurality of wavelengths $\lambda_1$ corresponding to the incident angles $\theta_1$. The wavelengths $\lambda_1$ of the image light L1 on the image source 120 have a two-dimensional spatial distribution D1, such that relationships between the incident angles $\theta_1$ and the wavelengths $\lambda_1$ of the image light L1 comply with Bragg selectivity of the most critical HOE 160 of the input coupler 110 or the output coupler 150. For example, in this embodiment, the input coupler 110 has a most critical HOE 160, and the output coupler 150 has a DOE 170. In such a configuration, the energy of the image light L1 may be preserved after the image light L1 is diffracted by the input coupler 110, and the diffractive optical assembly 100 may have higher diffractive efficiency compared with traditional diffractive optical elements. In addition, the head-mounted display 200 having the diffractive optical assembly 100 may enhance the field of view (FOV) while maintaining the optical efficiency and therefore improve the rate of energy utilization of the head-mounted display 200.

In some embodiments, the diffractive optical assembly 100 further includes a lens 130 disposed between the input coupler 110 and the image source 120 to collimate the image light L1, in which the image source 120 is located on a focal plane of the lens 130. In addition, the incident angles $\theta_1$ of the image light L1 have tolerances, so that the two-dimensional spatial distribution D1 of the wavelengths $\lambda_1$ may have multiple intervals shown in FIG. 1, in which the darker the intervals, the longer the wavelengths $\lambda_1$.

Figure 3B:
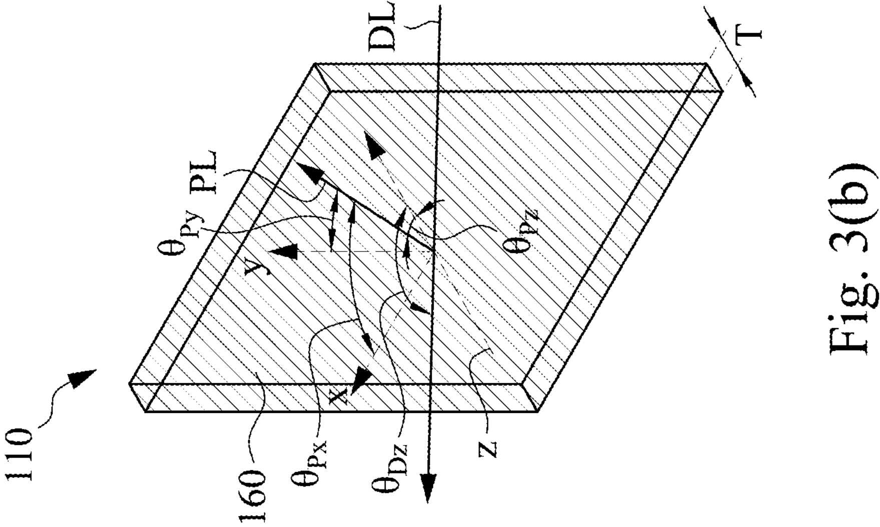
FIG. 3(*a*) and FIG. 3(*b*) are 3D schematic views of the most critical HOE of the diffractive optical assembly of FIG. 1 in a recording state and a reading state, respectively.
Figure 3A:
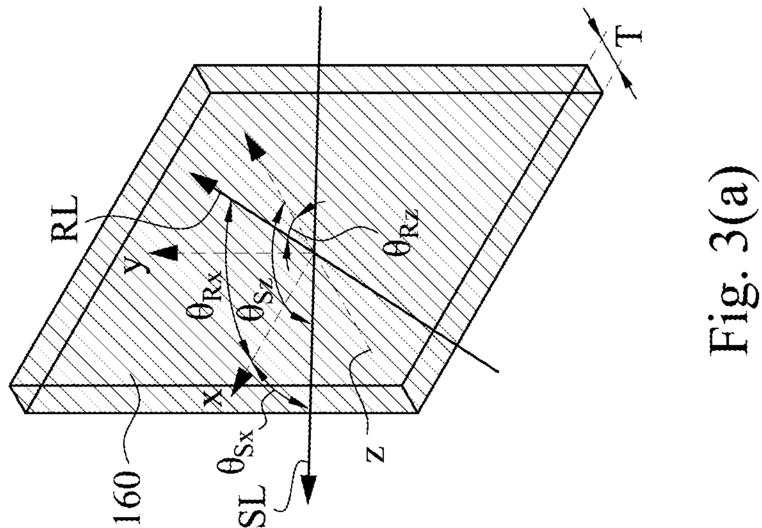

FIG. 3(*a*) is a 3D schematic view of the most critical HOE 160 of the diffractive optical assembly 100 of FIG. 1 in a recording state. As shown in FIG. 3(*a*), reference light RL and signal light SL respectively irradiate two opposite surfaces of the most critical HOE 160 during recording. The reference light RL have an incident angle $\theta_R$, and the signal light SL have an incident angle $\theta_S$. The incident angles are expressed as components deviated from the x, y, and z axis, i.e., $\theta_R=(\theta_{Rx},\theta_{Ry},\theta_{Rz})$ and $\theta_S=(\theta_{Sx},\theta_{Sy},\theta_{Sz})$. The coordinated system is defined to make the reference light RL and the signal light SL both lie on the x, z plane, i.e., they have no y component ($\theta_{Sy}=\theta_{Ry}=0$).

FIG. 3(*b*) is a 3D schematic view of the most critical HOE 160 of the diffractive optical assembly 100 of FIG. 1 in a reading state. As shown in FIG. 3(*b*), reading light PL is diffracted by the most critical HOE 160 and converts to diffraction light DL. The reading light PL has an incident angle θP, and the diffraction light DL has a diffraction angle $\theta_D$. The diffraction angle $\theta_D$ of the diffraction light DL and the incident angle $\theta_P$ of the reading light PL are expressed as components deviated from the x, y, z axis, i.e., $\theta_P=\theta_{Px}, \theta_{Py},\theta_{Pz}$ and $\theta_D=(\theta_{Dx},\theta_{Dy},\theta_{Dz})$. Referring to FIG. 3(*a*) and FIG. 3(*b*), to enhance the diffraction efficiency of the most critical HOE 160, the reading light PL incident to the most critical HOE 160 should obey Bragg selectivity of the most critical HOE 160, so that the relationship between the wavelength $\lambda_P$ and the incident angle $\theta_P$ of the reading light PL may be expressed as:

$$\lambda_P(\theta_{Px}, \theta_{Pz}) = \frac{\lambda_0[(\cos\theta_{Rx} - \cos\theta_{Sx})]}{1 - \cos\theta_{Sz}\cos\theta_{Rz} - \cos\theta_{Sx}cos\theta_{Rx}}\cos\theta_{Px} + \frac{-\lambda_0[(\cos\theta_{Sz} - \cos\theta_{Rz})]}{1 - \cos\theta_{Sz}\cos\theta_{Rz} - \cos\theta_{Sx}\cos\theta_{Rx}}\cos\theta_{Pz},$$

wherein $\lambda_0$ is the wavelength of the reference light RL same as the wavelength of the signal light SL.

Referring to FIG. 2 and FIG. 3(*b*), the image light L1 incident to the most critical HOE 160 may act as the reading light PL, so that the incident angles $\theta_1$ and the wavelengths $\lambda_1$ of the image light L1 may relate to the incident angles $\theta_P$ and the wavelength $\lambda_P$ of the reading light PL, respectively. In addition, the incident angles $\theta_1$ of the image light L1 may be expressed as $\theta_1=(\theta_{1x},\theta_{1y},\theta_{1z})$, and depend on the positions within the image source 120 from which the image light L1 generates, and may be expressed as:

$$\theta_{Ix}(x_I, y_1) = \cos^{-1}\left(x_1/\sqrt{n^2 f^2 + x_1^2}\right),$$

$$\theta_{1y}(x_1, y_1) = \cos^{-1}\left(y_1/\sqrt{n^2 f^2 + y_1^2}\right), \text{ and } \theta_{1z}(x_1, y_1) = \tan^{-1}\left(\sqrt{x_1^2 + y_1^2}/nf\right),$$

wherein $x_1$ and $y_1$ are the positions defined by $x_1$-$y_1$ coordinate along a lateral plane of the image source 120, n is the refractive index of the most critical HOE 160, and f is the focal length of the lens 130. When propagating to the most critical HOE 160 of the input coupler 110 (or the most critical HOE 160 of the output coupler 150 in other embodiments), there is a one-to-one mapping relation between $(\theta_{1x},\theta_{1y},\theta_{1z})$ and $(\theta_{Px},\theta_{Py},\theta_{Pz})$. And it is expressed as $\theta_{Px}=M_x(\theta_{1x},\theta_{1y},\theta_{1z}),\theta_{Py}=M_y(\theta_{1x},\theta_{1y},\theta_{1z})$ and $\theta_{Pz}=M_z(\theta_{1x}, \theta_{1y},\theta_{1z})$. In addition, an optical axis O of the lens 130 intersects the origin of the $x_1$-$y_1$ coordinate. Therefore, the relationships between the incident angles $\theta_1$ and the wavelengths distribution with peak diffraction efficiency $\lambda_{pk}$, which complies with Bragg selectivity of the most critical HOE 160, is a functional as follow:

$$\lambda_{pk}(\theta_{1x}, \theta_{1y}, \theta_{1z}) = \frac{\lambda_0[(\cos\theta_{Rx} - \cos\theta_{Sx})]}{1 - \cos\theta_{Sz}\cos\theta_{Rz} - \cos\theta_{Sx}\cos\theta_{Rx}}\cos[M_x(\theta_{1x}, \theta_{1y}, \theta_{1z})] + \frac{-\lambda_0[(\cos\theta_{Sz} - \cos\theta_{Rz})]}{1 - \cos\theta_{Sz}\cos\theta_{Rz} - \cos\theta_{Sx}\cos\theta_{Rx}}\cos[M_z(\theta_{1x}, \theta_{1y}, \theta_{1z})],$$

so that the wavelengths $\lambda_1$ of the image light L1 on the image source 120 may depend on coordinate values $x_1$ and $y_1$ of the image source 120 and have the two-dimensional spatial distribution D1. In some embodiments, the most critical HOE 160 may have a thickness T, and the tolerance of the wavelengths $\lambda_1$ complying with Bragg selectivity will be in a range from $$\lambda_{pk} + \frac{\lambda_0\left[\frac{1}{2}\cos^2\theta_{Pz} + \cos\theta_{Px}(\cos\theta_{Rx} - \cos\theta_{Sx})\right]}{1 - \cos\theta_{Sz}\cos\theta_{Rz} - \cos\theta_{Sx}\cos\theta_{Rx}}\left[\frac{(\cos\theta_{Sz} - \cos\theta_{Rz})^2}{(\cos\theta_{Sz} - \cos\theta_{Rz} + \lambda_0/T)^2} - 1\right]$$

to $$\lambda_{pk} + \frac{\lambda_0\left[\frac{1}{2}\cos^2\theta_{Pz} + \cos\theta_{Px}(\cos\theta_{Rx} - \cos\theta_{Sx})\right]}{1 - \cos\theta_{Sz}\cos\theta_{Rz} - \cos\theta_{Sx}\cos\theta_{Rx}}\left[\frac{(\cos\theta_{Sz} - \cos\theta_{Rz})^2}{(\cos\theta_{Sz} - \cos\theta_{Rz} - \lambda_0/T)^2} - 1\right].$$

More sensitive to Bragg condition means less tolerance of the wavelengths.

Figure 4:
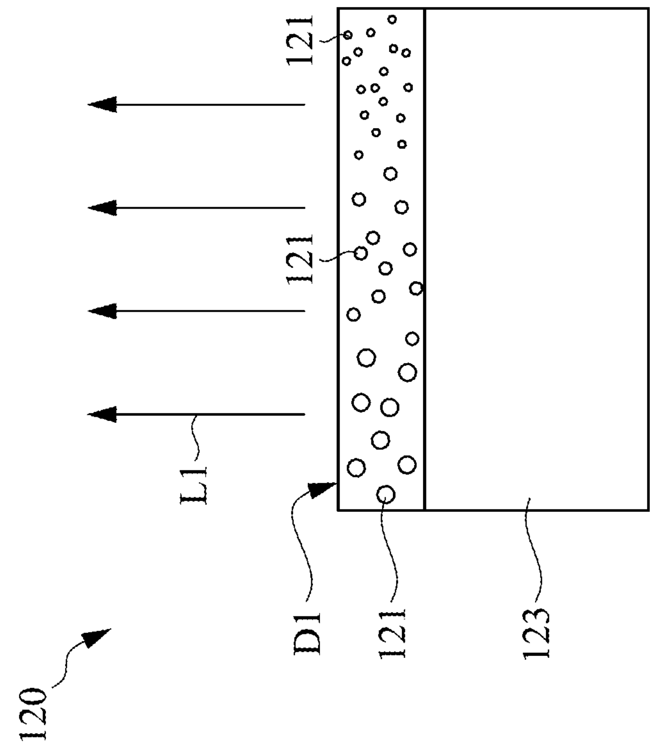
FIG. 4 is a schematic side view of an image source of the diffractive optical assembly of FIG. 1.

FIG. 4 is a schematic side view of the image source 120 of the diffractive optical assembly 100 of FIG. 1. The image source 120 may include a plurality of quantum dots 121 and a light source 123. The light source 123 can generate the image light L1. The quantum dots 121 are located on the light source 123. Sizes of the quantum dots 121 vary along the plane of the image source 120, such that the wavelengths $\lambda_1$ of the image light L1 on the image source 120 has the two-dimensional spatial distribution D1. In some embodiments, the light source 123 is a chip of micro light emitting diode (micro-LED) emitting ultraviolet or blue light, so that the image source 120 may be a micro-LED display.

Figure 5:
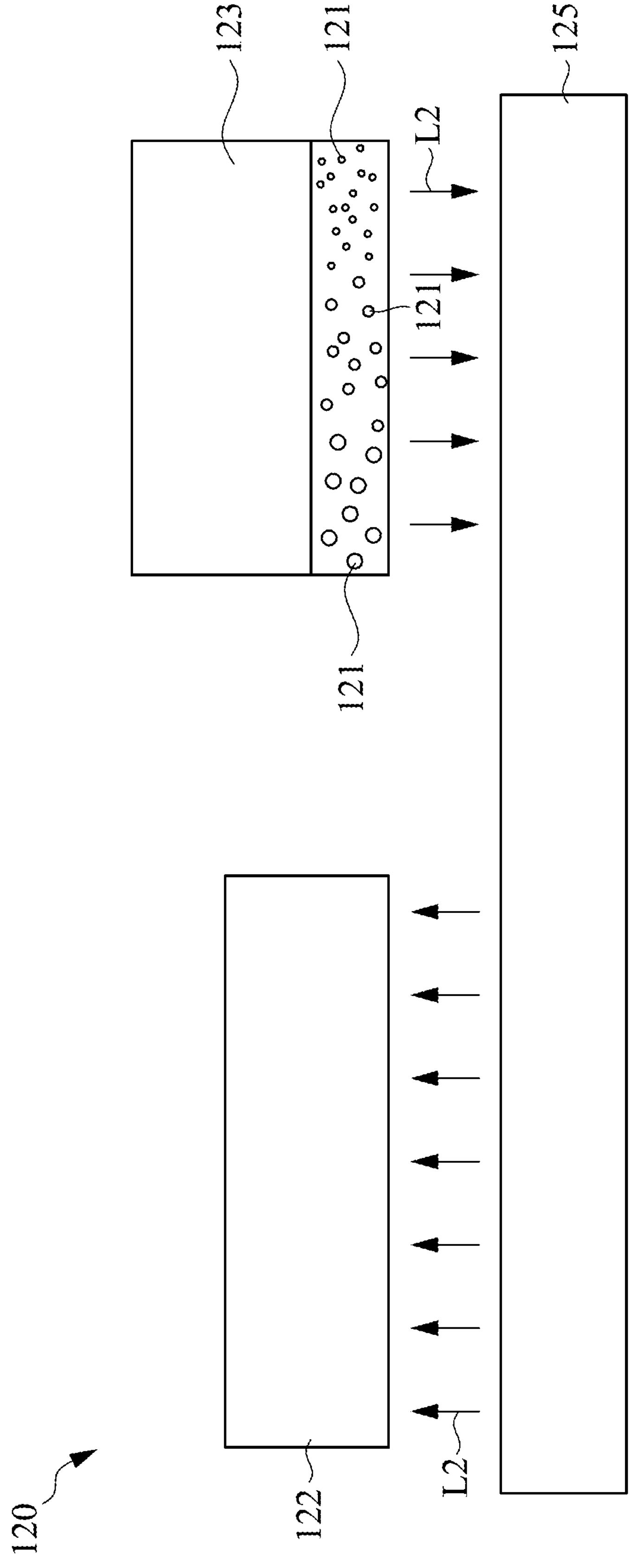
FIG. 5 is a schematic side view of an image source according to another embodiment of the present disclosure.

FIG. 5 is a schematic side view of an image source 120 according to another embodiment of the present disclosure. The image source 120 of FIG. 5 may include a spatial light modulator (SLM) 122, a light source 123 generating source light L2, and a plurality of quantum dots 121 located on the light source 123. Sizes of the quantum dots 121 are different, such that wavelengths $\lambda_2$ of the source light L2 irradiating the SLM 122 through the quantum dots 121 has a two-dimensional spatial distribution D2 along a plane of the SLM 122. In addition, the image source 120 of FIG. 5 may further include a light guide 125 configured to transmit the source light L2 to the SLM 122. In some embodiments, the two-dimensional spatial distribution D2 of the wavelengths $\lambda_2$ of the source light L2 of FIG. 5 is same as the aforementioned two-dimensional spatial distribution D1 of the wavelengths $\lambda_1$ of the image light L1 of FIG. 2, so that the source light L2 of FIG. 5 passing through the SLM 122 of FIG. 5 may act as the image light L1 of FIG. 2.

It is to be noted that the connection relationships and the advantages of the elements described above will not be repeated in the following statement. In the following description, other types of image sources will be explained.

Figure 6:
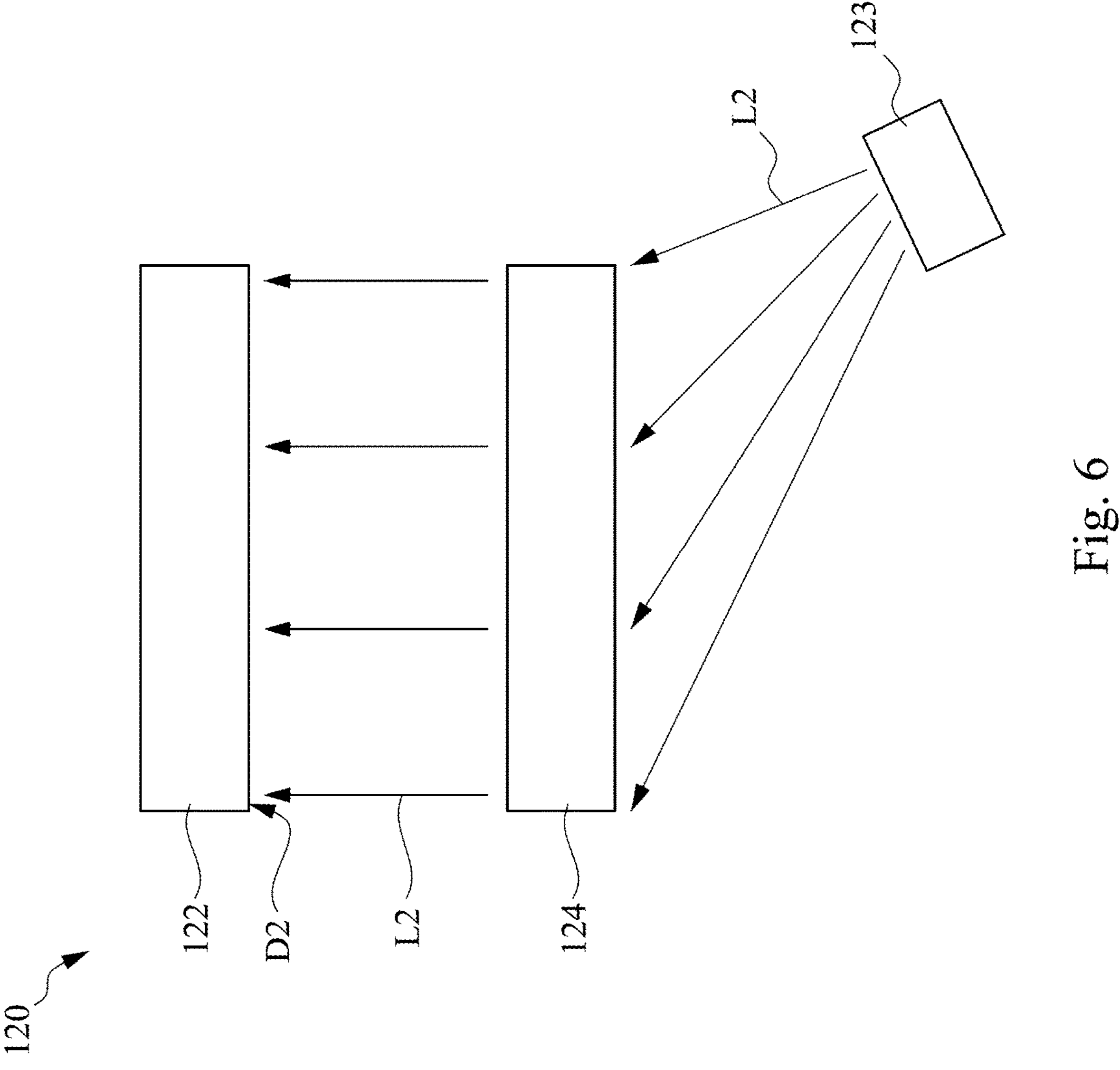
FIG. 6 is a schematic side view of an image source according to yet another embodiment of the present disclosure.

FIG. 6 is a schematic side view of an image source 120 according to yet another embodiment of the present disclosure. The image source 120 of FIG. 6 may include the SLM 122, a light source 123 generating source light L2, and a dispersive element 124. The light source 123 of FIG. 6 may be disposed at the side of the dispersive element 124 facing away from the SLM 122. The dispersive element 124 may be configured to split the source light L2 passing through the dispersive element 124 along a horizontal plane of the dispersive element 124 to irradiate the SLM 122, such that wavelengths $\lambda_2$ of the source light L2 on the SLM 122 have the two-dimensional spatial distribution D2. In some embodiments, the dispersive element 124 of FIG. 6 includes a surface relief grating, a metasurface, a metalens, a holographic grating, or a volume holographic optical element. In this embodiment, the dispersive element 124 is a transmission type.

Figure 7:
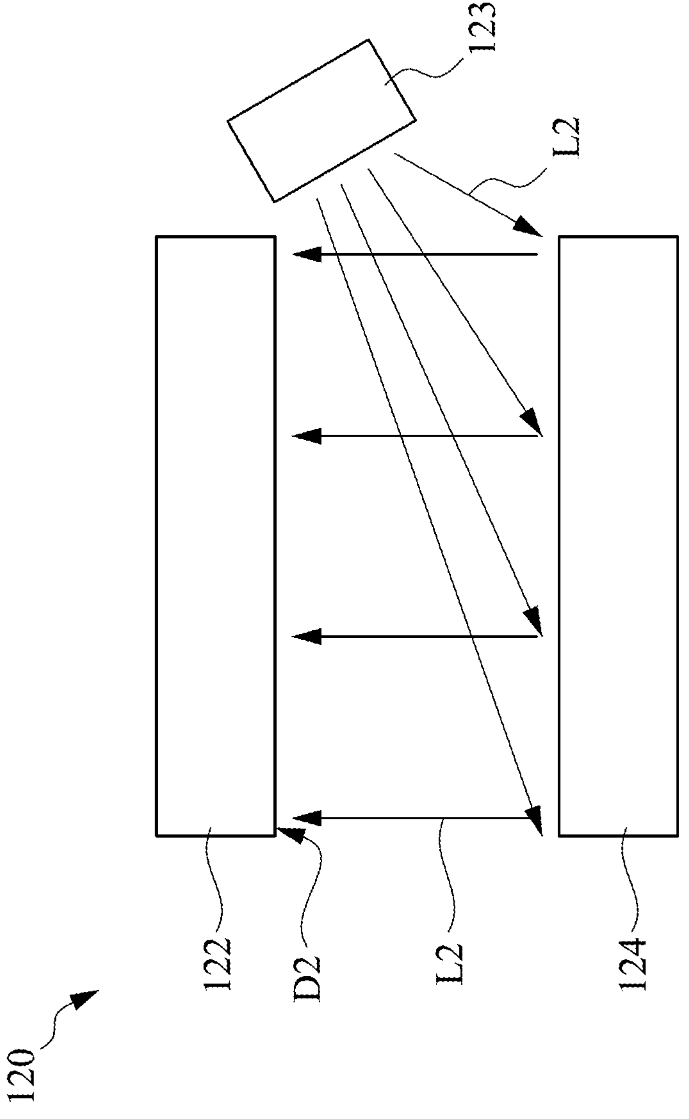
FIG. 7 is a schematic side view of an image source according to still another embodiment of the present disclosure.

FIG. 7 is a schematic side view of an image source 120 according to still another embodiment of the present disclosure. The image source 120 of FIG. 7 may include the SLM 122, the light source 123 generating source light L2, and the dispersive element 124. The difference between this embodiment and the embodiment of FIG. 6 is that the light source 123 of FIG. 7 is disposed at the side of the dispersive element 124 facing the SLM 122. The dispersive element 124 is configured to reflect the source light L2 to split along the horizontal plane of the dispersive element 124 to irradiate the SLM 122. In this embodiment, the dispersive element 124 is a reflection type.

Figure 8:
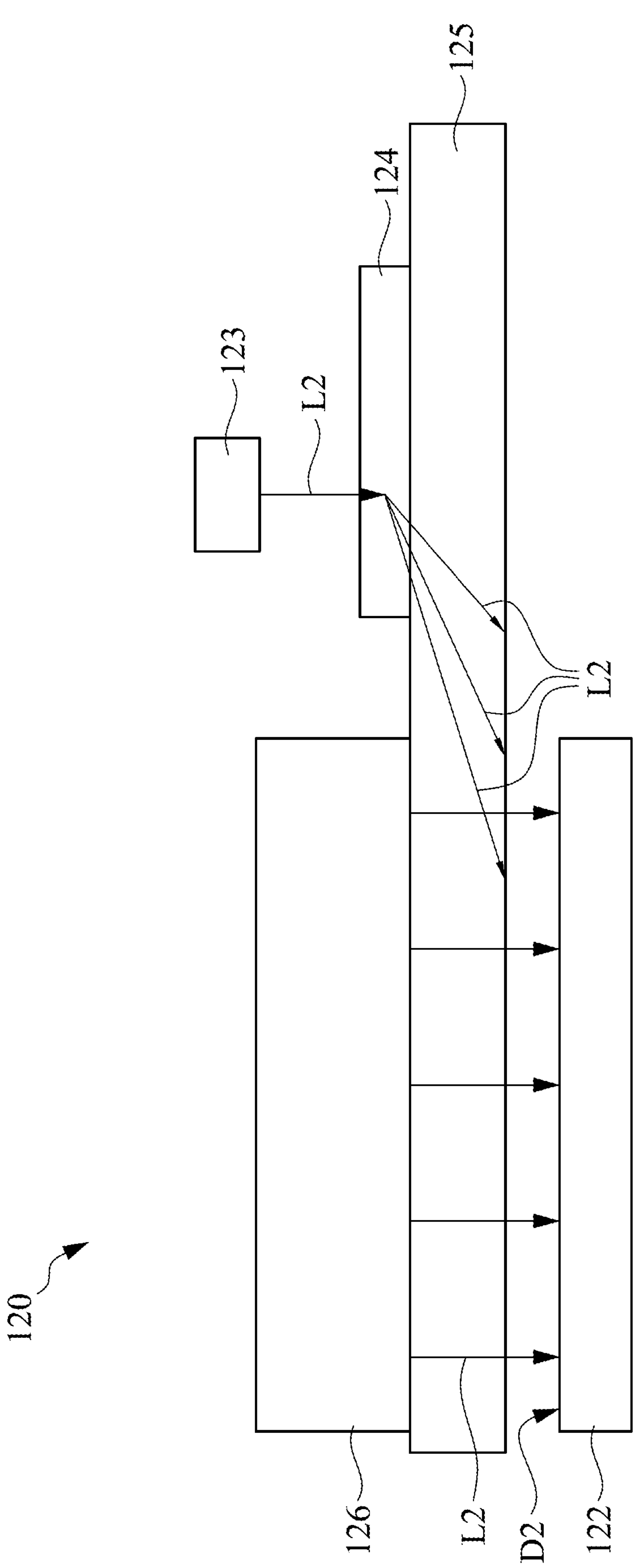
FIG. 8 is a schematic side view of an image source according to one embodiment of the present disclosure.

FIG. 8 is a schematic side view of an image source 120 according to one embodiment of the present disclosure. The image source 120 of FIG. 8 may include the SLM 122, the light source 123 generating source light L2, the dispersive element 124, the light guide 125 and a regular HOE 126. The dispersive element 124 of FIG. 8 is disposed on the light guide 125. The light source 123 of FIG. 8 is disposed on a side of the dispersive element 124 facing away the light guide 125. The SLM 122 and the regular HOE 126 of FIG. 8 are respectively disposed on two opposite sides of the light guide 125. The regular HOE 126 is in contact with the light guide 125 and disposed on the side of the light guide 125 on which the dispersive element 124 is disposed. The dispersive element 124 is configured to disperse the source light L2 emitted by the light source 123 along the lateral plane of the dispersive element 124. The light guide 125 is configured to propagate the source light L2 from the dispersive element 124 to the regular HOE 126. The regular HOE 126 is configured to reflect and reshape the source light L2 transmitted in the light guide 125 to irradiate the SLM 122, such that the wavelengths $\mu_2$ of the source light L2 on the SLM 122 have the two-dimensional spatial distribution D2. In some embodiments, the dispersive element 124 includes a holographic grating or a prism, and the regular HOE 126 includes a volume holographic optical element. Compared to the image source 120 of FIG. 6 or FIG. 7, the image source 120 of FIG. 8 may further save space.

Figure 9:
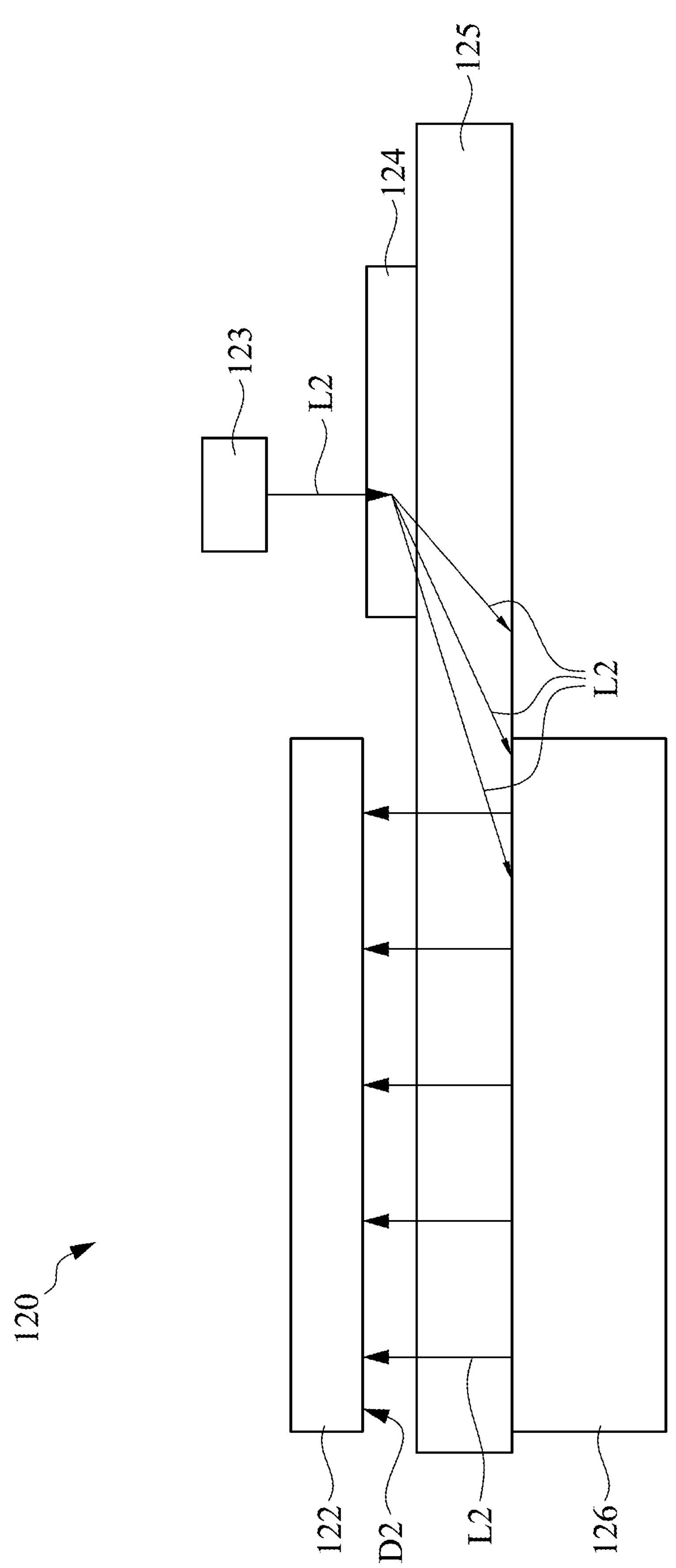
FIG. 9 is a schematic side view of an image source according to another embodiment of the present disclosure.

FIG. 9 is a schematic side view of an image source 120 according to another embodiment of the present disclosure. The image source 120 of FIG. 9 includes the SLM 122, the light source 123 generating source light L2, the dispersive element 124, the light guide 125 and a regular HOE 126. The dispersive element 124 is disposed on the light guide 125. The difference between this embodiment and the embodiment of FIG. 8 is that the regular HOE 126 of FIG. 9 is disposed on the side of the light guide 125 facing away from the dispersive element 124.

Figure 10:
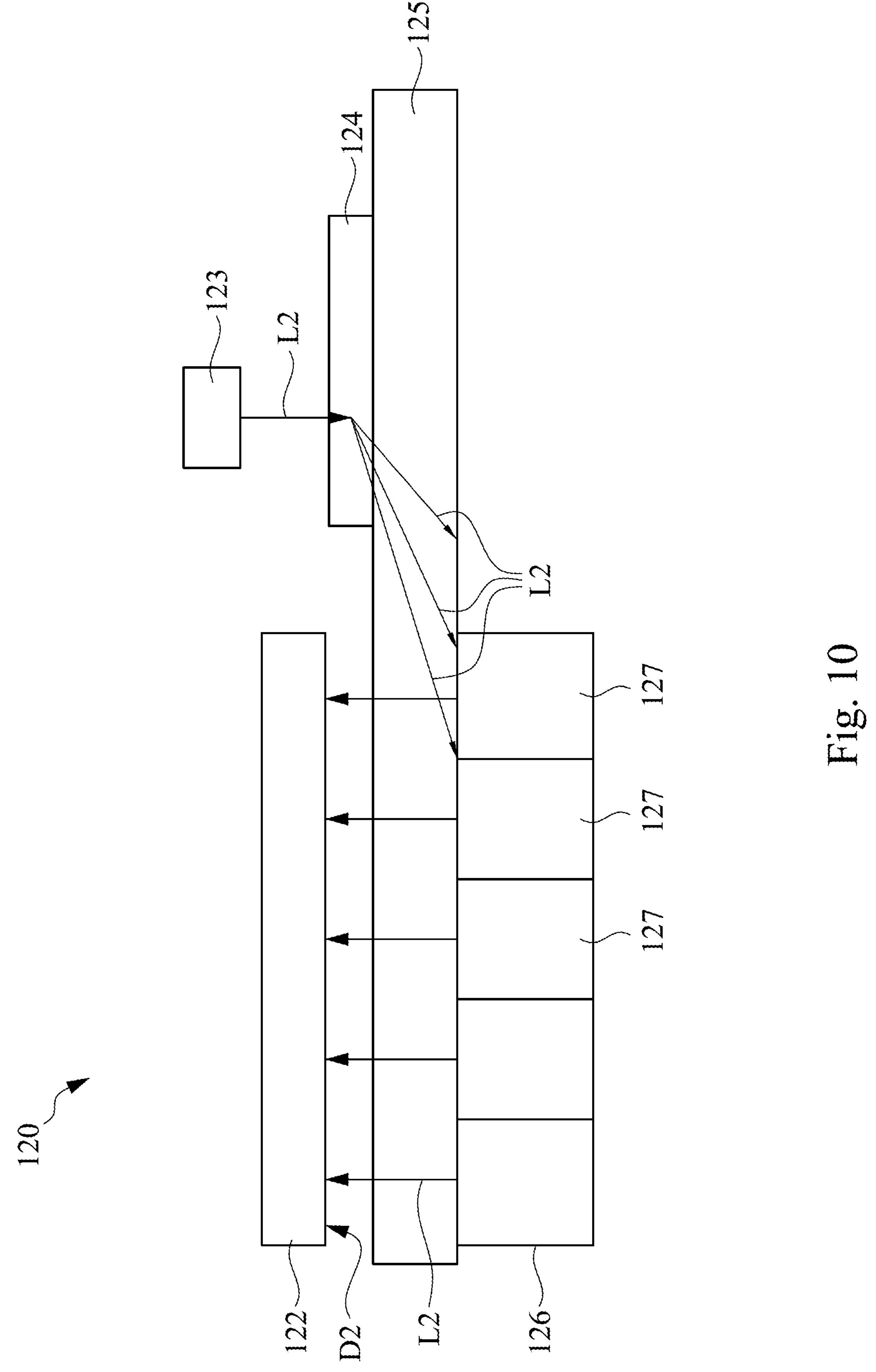
FIG. 10 is a schematic side view of an image source according to yet another embodiment of the present disclosure.

FIG. 10 is a schematic side view of an image source 120 according to yet another embodiment of the present disclosure. The image source 120 of FIG. 10 includes the SLM 122, the light source 123 generating source light L2, the dispersive element 124, the light guide 125 and a regular HOE 126. The dispersive element 124 is disposed on the light guide 125. The difference between this embodiment and the embodiment of FIG. 9 is that the regular HOE 126 of FIG. 10 includes a plurality of second sub HOEs 127 disposed side by side.

Figure 11:
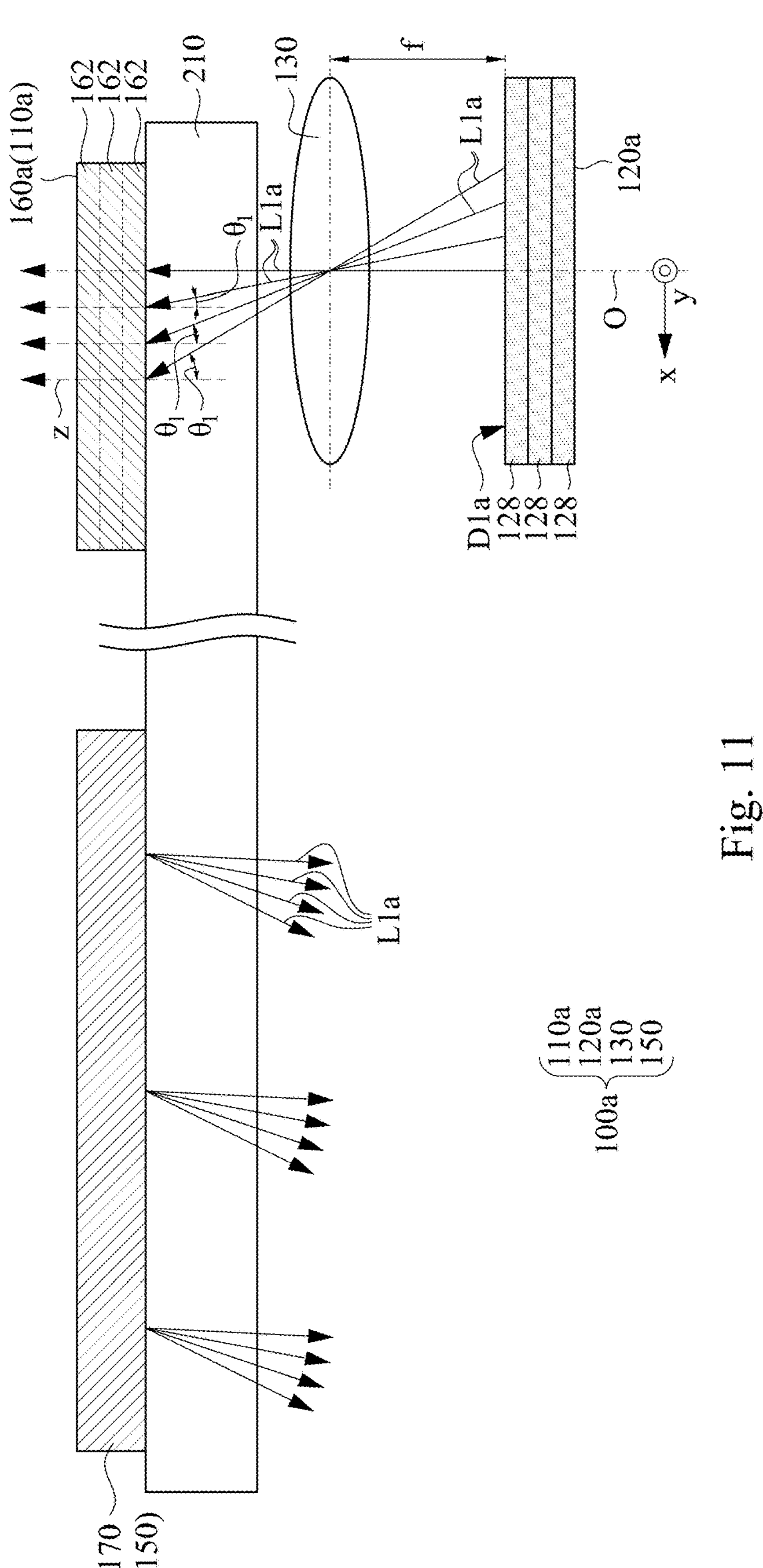
FIG. 11 is a schematic side view of a head-mounted display having a diffractive optical assembly when being in operation according to another embodiment of the present disclosure.

FIG. 11 is a schematic side view of a head-mounted display 200*a* having a diffractive optical assembly 100*a* when being in operation according to one embodiment of the present disclosure. The head-mounted display 200*a* includes the diffractive optical assembly 100*a* and the light guide 210. The diffractive optical assembly 100*a* includes an input coupler 110*a*, an image source 120*a*, and the output coupler 150. In this embodiment, the input coupler 110*a* has a most critical HOE 160*a*, and the output coupler 150 has the DOE 170, in which Bragg condition of the most critical HOE 160*a* is more sensitive than Bragg condition of the DOE 170. Alternatively, in other embodiments, the input coupler 110*a* may have the DOE 170, and the output coupler 150 may have the most critical HOE 160*a*. The image source 120*a* is configured to generate image light L1*a* incident to the input coupler 110*a*. The difference between the head-mounted display 200*a* of FIG. 11 and the head-mounted display 200 of FIG. 1 is that the image source 120*a* includes a plurality of color channels 128, and each of the color channels 128 is configured to generate a portion of the image light L1*a*, so that the image source 120*a* may act as a color image source.

In some embodiments, the most critical HOE 160*a* may be a volume HOE including a plurality of holographic gratings, and the holographic gratings are configured to diffract the image light L1*a* generated by the color channels 128, respectively. Alternatively, the most critical HOE 160*a* may include a plurality of sub HOEs 162, and the sub HOEs 162 are configured to diffract the image light L1*a* generated by the color channels 128, respectively.

Figure 12:
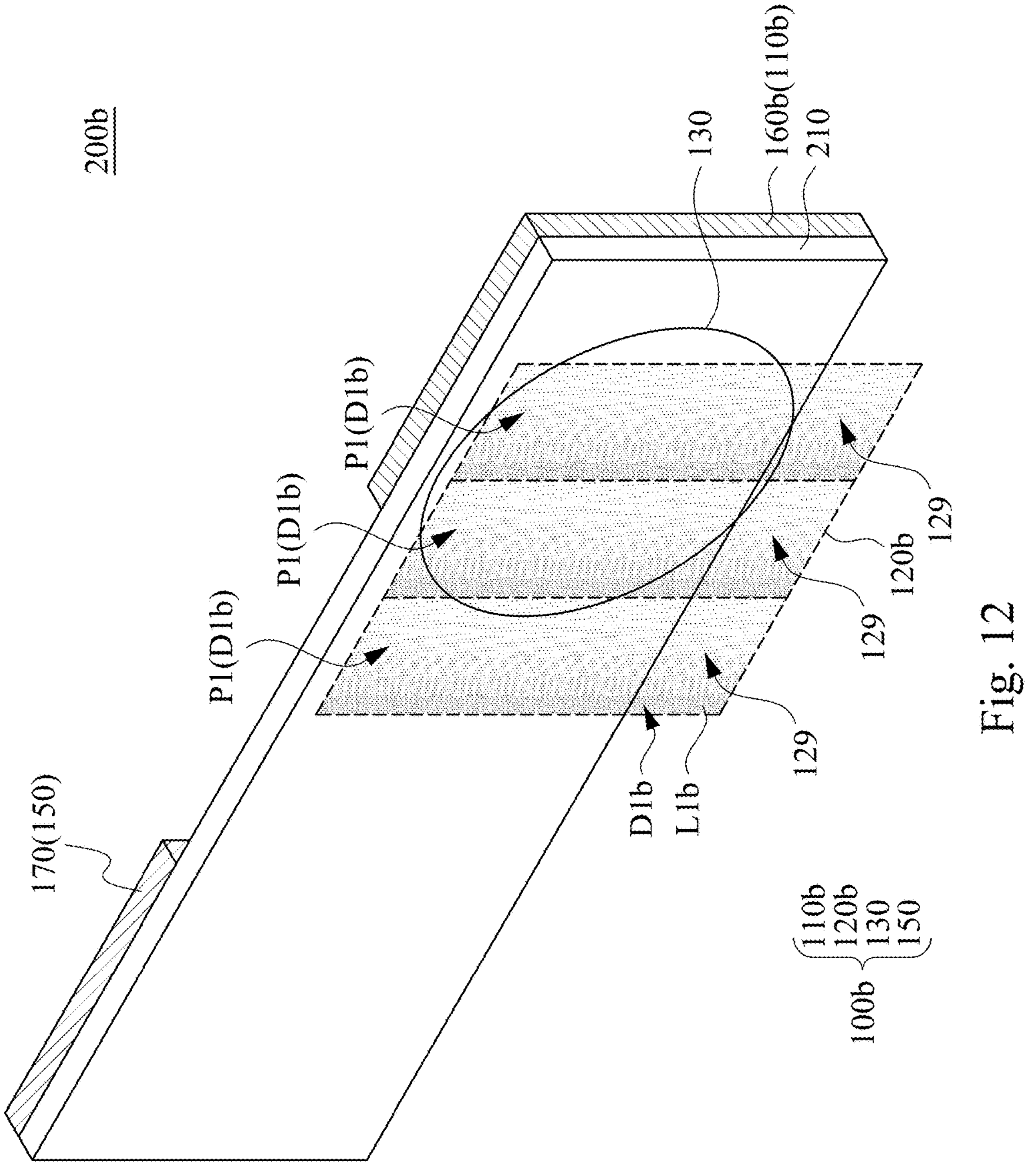
FIG. 12 is a 3D perspective view of a head-mounted display having a diffractive optical assembly according to yet another embodiment of the present disclosure.
Figure 13:
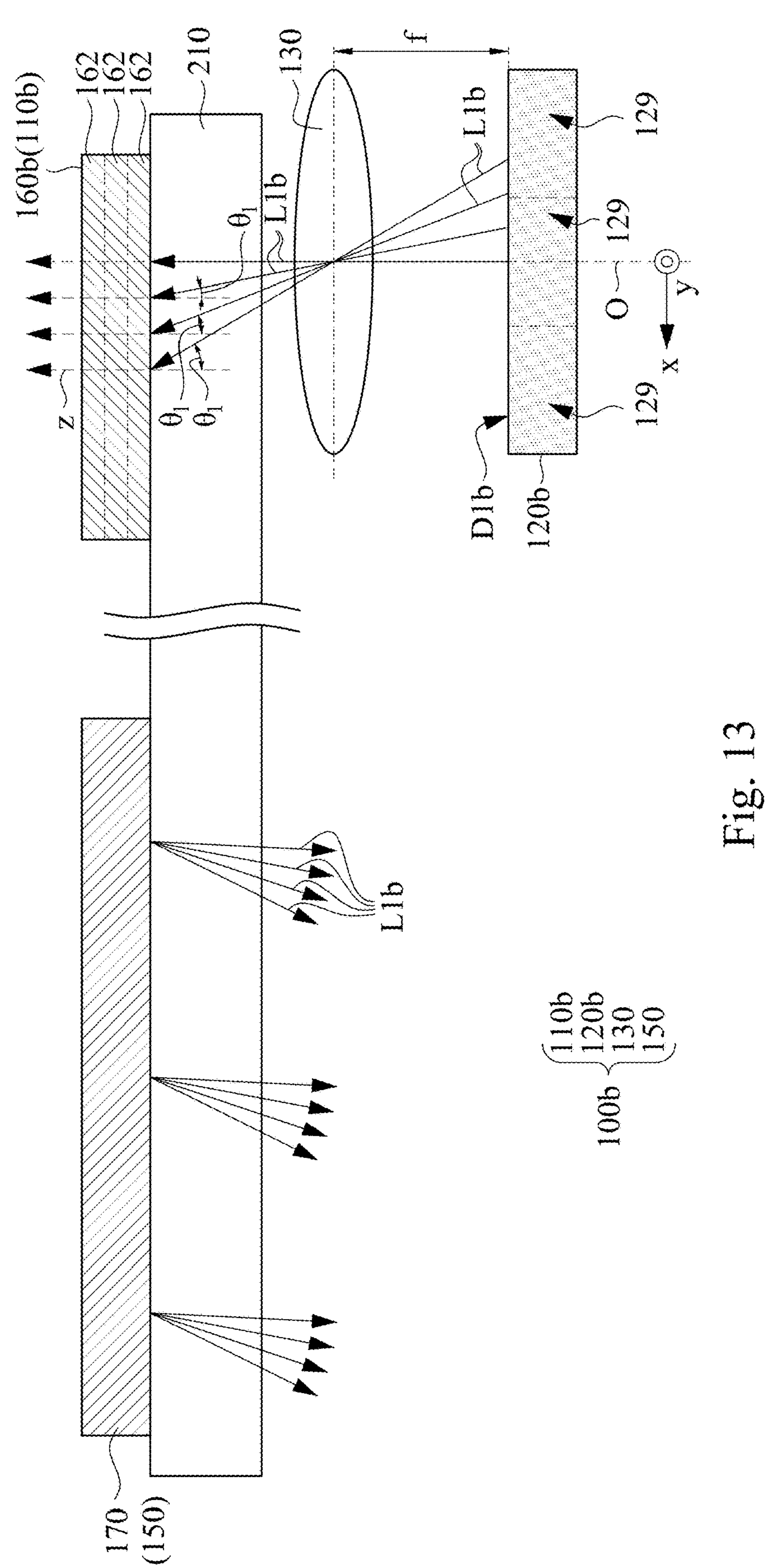
FIG. 13 is a schematic side view of the head-mounted display of FIG. 12 when being in operation.

FIG. 12 is a 3D perspective view of a head-mounted display 200*b* having a diffractive optical assembly 100*b* according to yet another embodiment of the present disclosure. FIG. 13 is a schematic side view of the head-mounted display 200*b* of FIG. 12 when being in operation. As shown in FIG. 12 and FIG. 13, the head-mounted display 200*b* includes the diffractive optical assembly 100*b* and the light guide 210. The diffractive optical assembly 100*b* includes an input coupler 110*b*, an image source 120*b*, and the output coupler 150. The image source 120*b* is configured to generate image light L1*b* incident to the input coupler 110*b*. The difference between the head-mounted display 200*b* of FIG. 12 and the head-mounted display 200 of FIG. 1 is that the image source 120*b* includes a plurality of regions 129, the regions 129 generate the image light L1*b* having the incident angles $\theta_1$ in a plurality of ranges not overlapping with each other, and portions P1 of the two-dimensional spatial distribution D1*b* of the wavelengths $\lambda_1$ of the image light L1*b* respectively located in the regions 129 of the image source 120*b* are continuous.

In some embodiments, the most critical HOE 160*b* of the input coupler 110*b* may be a volume HOE including a plurality of holographic gratings. The holographic gratings may be configured to diffract the image light L1*b* having the incident angles $\theta_1$ in the ranges R, respectively. Alternatively, the most critical HOE 160*b* of the input coupler 110*b* may include a plurality of sub HOEs 162. The sub HOEs 162 are configured to diffract the image light L1*b* having the incident angles $\theta_1$ in the ranges R, respectively. In such a configuration, the head-mounted display 200*b* may have higher chromaticity and saturation, thereby improving the performance of the color mixing ability of the head-mounted display 200*b*.

Figure 14:
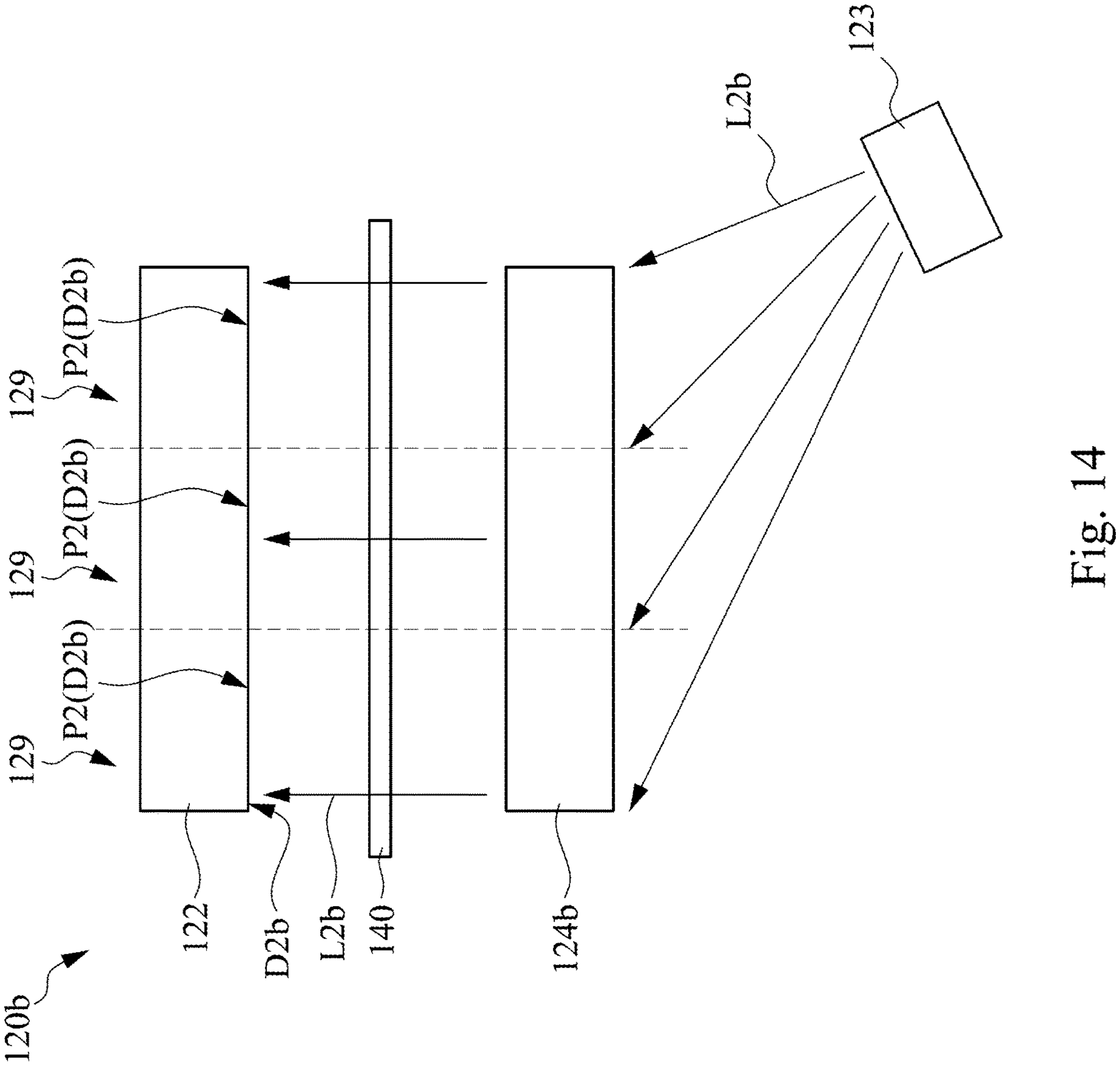
FIG. 14 is a schematic side view of the image source of the diffractive optical assembly of FIG. 12.

FIG. 14 is a schematic side view of the image source 120*b* of the diffractive optical assembly 100*b* of FIG. 12. As shown in FIG. 14, the image source 120*b* may include the SLM 122, the light source 123 generating source light L2*b*, and a dispersive element 124*b*. The difference between the image source 120*b* and the image source 120 of FIG. 6 is that the dispersive element 124*b* is configured to split the source light L2*b* such that portions P2 of a two-dimensional spatial distribution D2*b* of the wavelengths $\lambda_2$ of the source light L2*b* irradiating the SLM 122 respectively located in the regions 129 are continuous. In addition, portions P2 of the two-dimensional spatial distribution D2*b* of the wavelengths $\lambda_2$ of the source light L2*b* respectively located in the regions 129 may be same with each other. In some embodiments, the image source 120*b* may further include a bandpass filter 140 disposed between the SLM 122 and the dispersive element 124*b* to prevent portions of the source light L2*b* in the regions 129 from interfering with each other. In addition, the two-dimensional spatial distribution D2*b* of the wavelengths $\lambda_2$ of the source light L2*b* is same as the two-dimensional spatial distribution D1*b* (see FIG. 12) of the wavelengths $\lambda_1$ of the image light L1*b* (see FIG. 12) on the image source 120*b*, so that the source light L2*b* pass through the SLM 122 may serve as the image light L1*b*. In this embodiment, the dispersive element 124 is a transmission type DOE.

Figure 15:
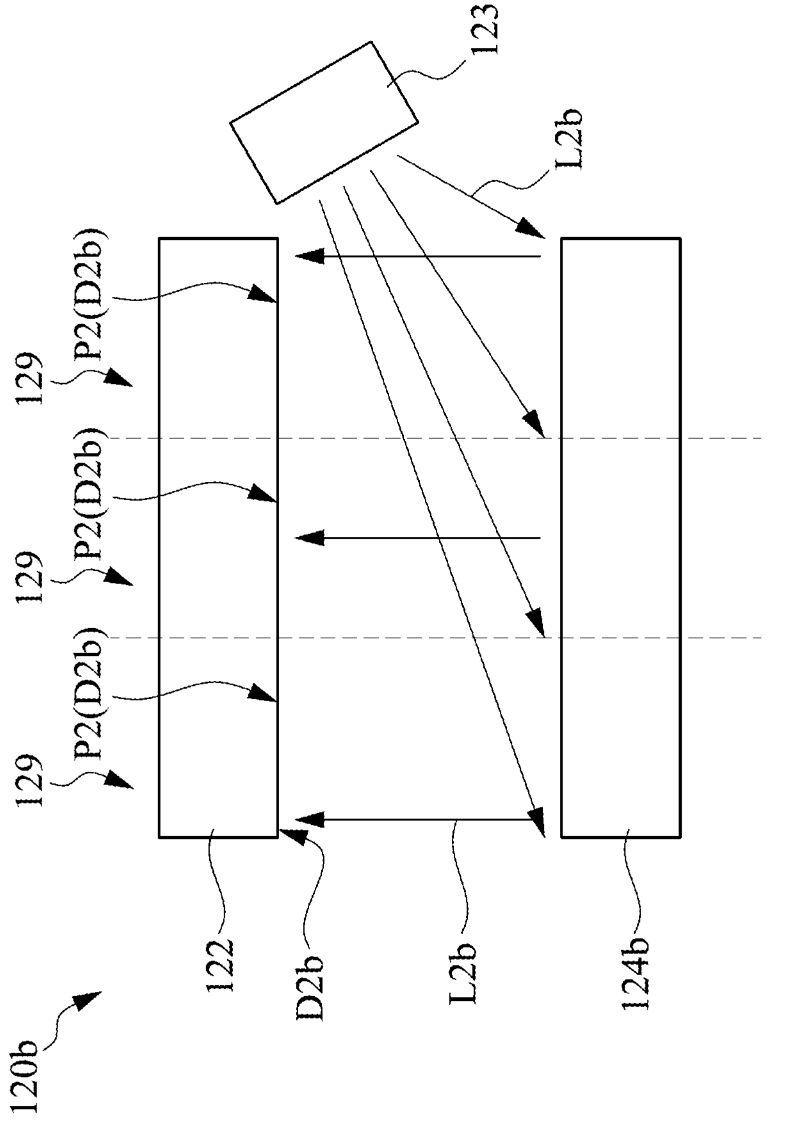
FIG. 15 is a schematic side view of an image source according to one embodiment of the present disclosure.

FIG. 15 is a schematic side view of an image source 120*b* according to another embodiment of the present disclosure. As shown in FIG. 15, the image source 120*b* of FIG. 15 may include the SLM 122, the light source 123 generating source light L2*b*, and a dispersive element 124*b*. The difference between this embodiment and the embodiment of FIG. 14 is that the light source 123 of the image source 120*b* of FIG. 15 is disposed at the side of the dispersive element 124*b* facing the SLM 122. In this embodiment, the dispersive element 124 is a reflection type DOE.

Figure 16:
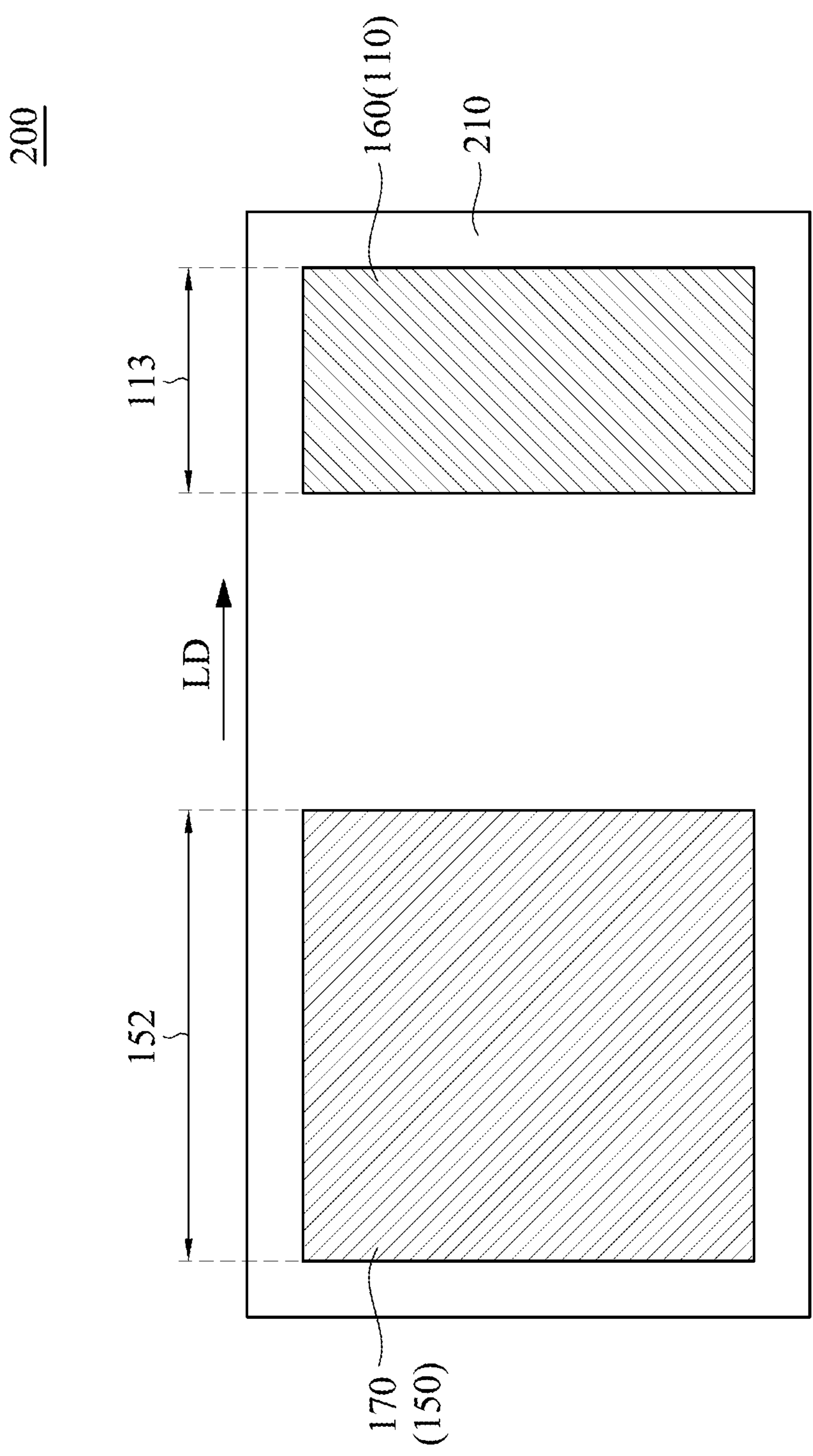
FIG. 16 is a top view of the head-mounted display of FIG. 1.

FIG. 16 is a top view of the head-mounted display 200 of FIG. 1. As shown in FIG. 2 and FIG. 16, the light guide 210 is connected to the input coupler 110 and the output coupler 150 of the diffractive optical assembly 100, and is disposed between the input coupler 110 and the image source 120 of the diffractive optical assembly 100. In addition, along the lengthwise direction LD of the light guide 210, the length 152 of the output coupler 150 is longer than the length 113 of the input coupler 110. In such a configuration, the head-mounted display 200 may achieve exit-pupil expansion (EPE) with lower energy loss.

Figure 17:
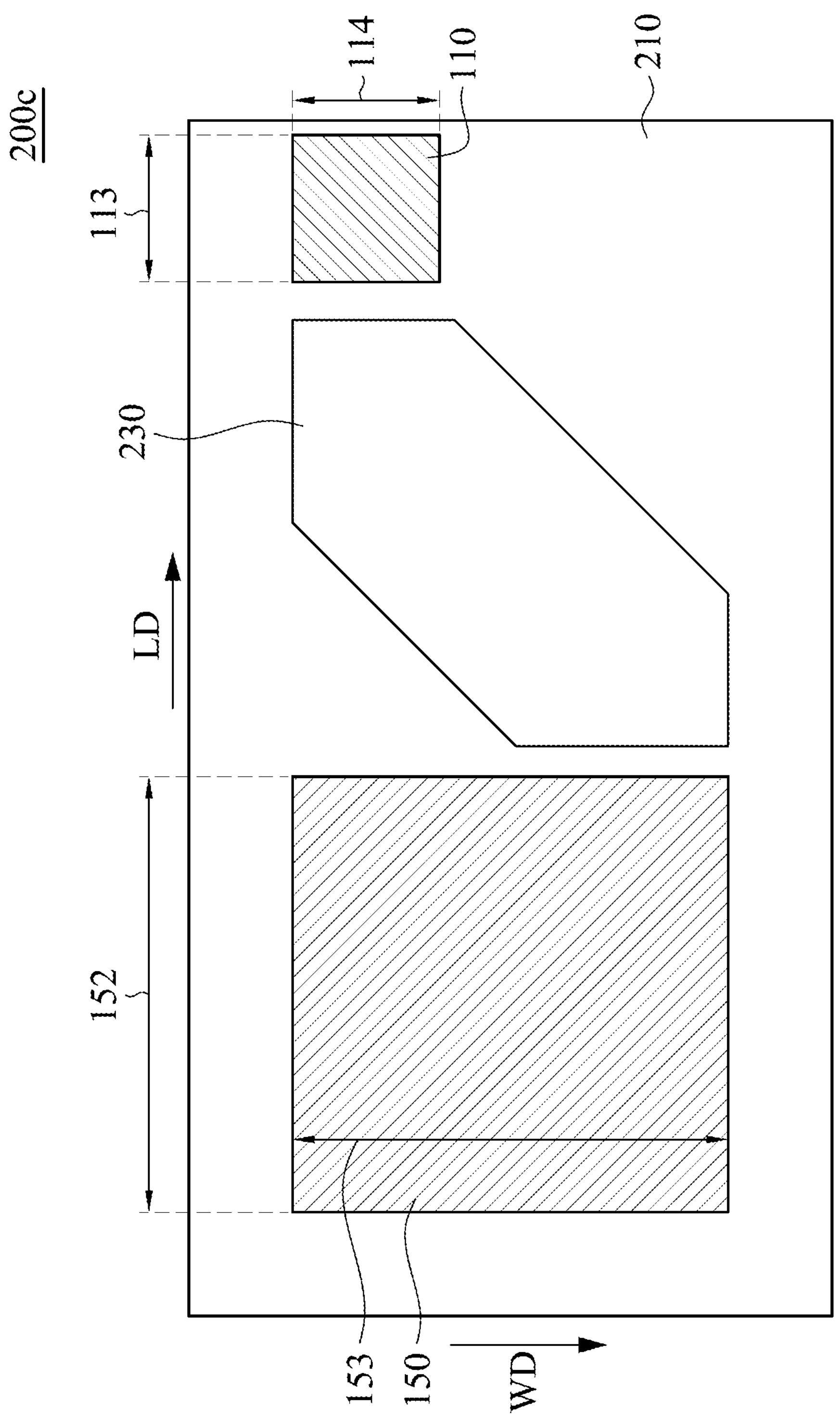
FIG. 17 is a top view of a head-mounted display according to one embodiment of the present disclosure.

FIG. 17 is a top view of a head-mounted display 200*c* according to one embodiment of the present disclosure. As shown in FIG. 17, the difference between the head-mounted display 200*c* and the head-mounted display 200 of FIG. 16 is that the head-mounted display 200*c* further includes a two-dimensional grating 230 disposed on the light guide 210 and between the input coupler 110 and the output coupler 150. In addition, the length 113 and the width 114 of the input coupler 110 are respectively less than the length 152 and the width 153 of the output coupler 150, so that the head-mounted display 200*c* may achieve 2D EPE.

Figure 18:
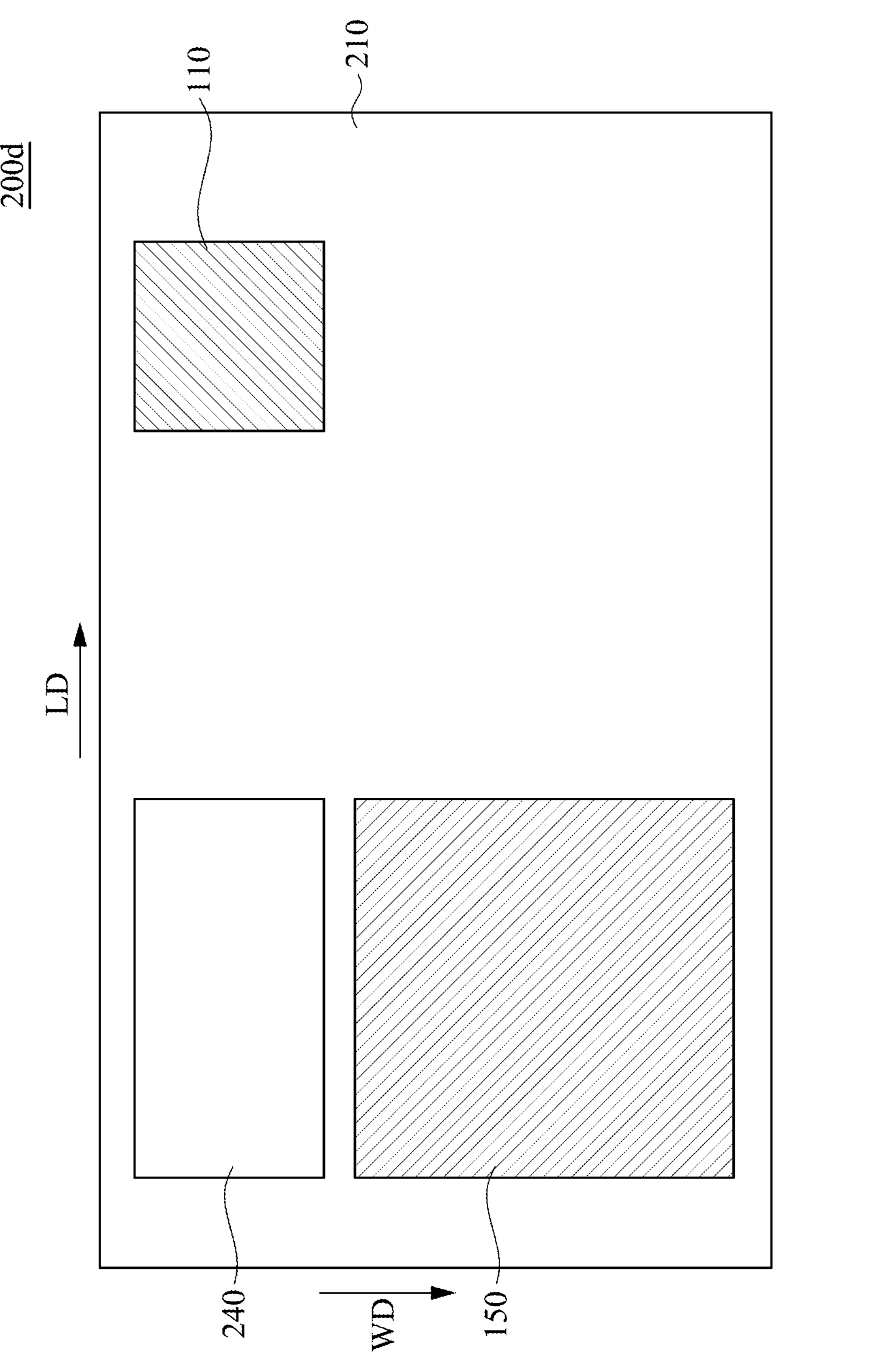
FIG. 18 is a top view of a head-mounted display according to another embodiment of the present disclosure.

FIG. 18 is a top view of a head-mounted display 200*d* according to another embodiment of the present disclosure. As shown in FIG. 18, the difference between the head-mounted display 200*d* and the head-mounted display 200 of FIG. 16 is that the head-mounted display 200*d* further includes a surface relief grating 240 disposed on the light guide 210. The surface relief grating 240 is aligned with the input coupler 110 along the lengthwise direction LD of the light guide 210, and is aligned with the output coupler 150 along the widthwise direction WD of the light guide 210. In such a configuration, the head-mounted display 200*d* may achieve 2D EPE.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A diffractive optical assembly, comprising:

an input coupler;

an output coupler next to the input coupler, wherein one of the input coupler and the output coupler has a most critical holographic optical element (HOE), another one of the input coupler and the output coupler has a diffractive optical element (DOE), and Bragg condition of the most critical HOE is more sensitive than Bragg condition of the DOE; and an image source configured to directly generate image light that is incident to the input coupler then propagates to the output coupler, wherein the image light has a plurality of different incident angles to the input coupler and a plurality of wavelengths corresponding to the different incident angles, and the wavelengths of the image light directly generated from the image source have a two-dimensional spatial distribution, such that relationships between the different incident angles and the wavelengths of the image light comply with Bragg selectivity of the most critical HOE of the input coupler or the output coupler.

2. The diffractive optical assembly of claim 1, wherein the image source comprises a plurality of regions, the regions generate the image light having the different incident angles in a plurality of ranges not overlapping with each other, and a portion of the two-dimensional spatial distribution of the wavelengths of the image light in each of the regions of the image source is continuous.

3. The diffractive optical assembly of claim 2, wherein the most critical HOE of the input coupler or the output coupler comprises a plurality of first holographic gratings, and the first holographic gratings are configured to diffract the image light having the different incident angles in the ranges, respectively.

4. The diffractive optical assembly of claim 2, wherein the most critical HOE of the input coupler or the output coupler comprises a plurality of sub HOEs, and the sub HOEs are configured to diffract the image light having the different incident angles in the ranges, respectively.

5. The diffractive optical assembly of claim 1, wherein the image source comprises a light source and a plurality of quantum dots located on the light source, and sizes of the quantum dots vary along a horizontal plane of the image source, such that the wavelengths of the image light on the image source has the two-dimensional spatial distribution.

6. The diffractive optical assembly of claim 1, wherein the image source comprises a spatial light modulator (SLM), a light source generating source light, and a plurality of quantum dots located on the light source, and sizes of the quantum dots are different, such that wavelengths of the source light irradiating the SLM through the quantum dots has a two-dimensional spatial distribution along a horizontal plane of the SLM.

7. The diffractive optical assembly of claim 1, wherein the image source comprises a spatial light modulator (SLM), a light source generating source light, and a dispersive element.

8. The diffractive optical assembly of claim 7, wherein the light source is disposed at a side of the dispersive element facing away from the SLM, the dispersive element is configured to disperse the source light passing through the dispersive element along a horizontal plane of the dispersive element to irradiate the SLM, and wavelengths of the source light on the SLM have a two-dimensional spatial distribution.

9. The diffractive optical assembly of claim 7, wherein the light source is disposed at a side of the dispersive element facing the SLM, the dispersive element is configured to disperse the source light to split along a horizontal plane of the dispersive element to irradiate the SLM, and wavelengths of the source light on the SLM have a two-dimensional spatial distribution.

10. The diffractive optical assembly of claim 7, wherein the image source further comprises a bandpass filter disposed between the SLM and the dispersive element.

11. The diffractive optical assembly of claim 7, wherein the dispersive element of the image source comprises a surface relief grating, a metasurface, a metalens, a holographic grating, or a volume holographic optical element.

12. The diffractive optical assembly of claim 1, wherein the image source comprises a spatial light modulator (SLM), a light source generating source light, a dispersive element, a light guide and a regular HOE, the dispersive element is disposed on the light guide, the light source is disposed on a side of the dispersive element facing away the light guide, the SLM and the regular HOE are respectively disposed on two opposite sides of the light guide, the regular HOE is in contact with the light guide, the dispersive element is configured to split the source light, the light guide is configured to transmit the source light from the dispersive element to the regular HOE, the regular HOE is configured to reflect and reshape the source light to irradiate the SLM, and wavelengths of the source light on the SLM have a two-dimensional spatial distribution.

13. The diffractive optical assembly of claim 12, wherein the regular HOE of the image source is disposed on one of the two opposite sides of the light guide facing the dispersive element.

14. The diffractive optical assembly of claim 12, wherein the regular HOE of the image source is disposed on one of the two opposite sides of the light guide facing away from the dispersive element.

15. The diffractive optical assembly of claim 12, wherein the regular HOE of the image source comprises a plurality of second sub HOEs disposed side by side.

16. The diffractive optical assembly of claim 12, wherein the regular HOE of the image source comprises a volume holographic optical element, and the dispersive element of the image source comprises a holographic grating or a prism.

17. The diffractive optical assembly of claim 1, wherein the image source comprises a plurality of color channels, and each of the color channels is configured to generate a portion of the image light.

18. The diffractive optical assembly of claim 17, wherein the most critical HOE of the input coupler or the output coupler comprises a plurality of holographic gratings, and the holographic gratings are configured to diffract the image light generated by the color channels, respectively.

19. The diffractive optical assembly of claim 17, wherein the most critical HOE of the input coupler or the output coupler comprises a plurality of sub HOEs, and the sub HOEs are configured to diffract a portion of the image light generated by the color channels, respectively.

20. The diffractive optical assembly of claim 1, further comprising:

a lens disposed between the input coupler and the image source, wherein the image source is located on a focal plane of the lens.

21. A head-mounted display, comprising:

a diffractive optical assembly comprising:

an input coupler;

an output coupler next to the input coupler, wherein one of the input coupler and the output coupler has a most critical holographic optical element (HOE), another one of the input coupler and the output coupler has a diffractive optical element (DOE), and Bragg condition of the most critical HOE is more sensitive than Bragg condition of the DOE; and an image source configured to directly generate image light that is incident to the input coupler then propagates to the output coupler, wherein the image light has a plurality of different incident angles to the input coupler and a plurality of wavelengths corresponding to the different incident angles, and the wavelengths of the image light directly generated from the image source have a two-dimensional spatial distribution, such that relationships between the different incident angles and the wavelengths of the image light comply with Bragg selectivity of the most critical HOE of the input coupler or the output coupler; and a light guide connected to the input coupler and the output coupler of the diffractive optical assembly, and disposed between the input coupler and the image source of the diffractive optical assembly.

22. The head-mounted display of claim 21, further comprising:

a two-dimensional grating disposed on the light guide and between the input coupler and the output coupler.

23. The head-mounted display of claim 21, further comprising:

a surface relief grating disposed on the light guide, wherein the surface relief grating is aligned with the input coupler along a lengthwise direction of the light guide, and is aligned with the output coupler along a widthwise direction of the light guide.

* * * * *